United States Patent
Roither et al.

(10) Patent No.: US 6,952,976 B2
(45) Date of Patent: Oct. 11, 2005

(54) ELECTRIC-MOTOR-DRIVEN ACTUATOR

(75) Inventors: Andreas Roither, Enger (DE); Ralf Bokämper, Lübbecke (DE)

(73) Assignee: La-Z-Boy Incorporated, Monroe, MI (US)

(*) Notice: Subject to any disclaimer, the term of this patent is extended or adjusted under 35 U.S.C. 154(b) by 0 days.

(21) Appl. No.: 10/196,851

(22) Filed: Jul. 17, 2002

(65) Prior Publication Data

US 2003/0024338 A1 Feb. 6, 2003

Related U.S. Application Data

(63) Continuation of application No. PCT/EP01/13249, filed on Nov. 16, 2001.

(30) Foreign Application Priority Data

Nov. 17, 2000 (DE) .................................. 200 19 630 U

(51) Int. Cl.⁷ .............................................. F16H 37/00
(52) U.S. Cl. ......................................... 74/425; 297/330
(58) Field of Search ............................. 74/425; 297/330

(56) References Cited

U.S. PATENT DOCUMENTS

| | | | | |
|---|---|---|---|---|
| 3,712,573 A | * | 1/1973 | Pickles ........................ 248/394 |
| 4,067,184 A | * | 1/1978 | Johnson, Jr. ................. 57/135 |
| 4,331,313 A | * | 5/1982 | Pickles ........................ 248/394 |
| 4,834,456 A | * | 5/1989 | Barros et al. ................ 297/403 |
| 5,564,308 A | * | 10/1996 | Hoshikawa et al. ....... 74/89.14 |
| 5,746,076 A | * | 5/1998 | Inoue ........................... 70/277 |
| 5,960,670 A | | 10/1999 | Iverson et al. |
| 5,970,813 A | * | 10/1999 | Parkins et al. ................ 74/425 |
| 6,050,641 A | * | 4/2000 | Benson .................... 297/284.4 |
| 6,091,171 A | * | 7/2000 | Ohishi et al. ............. 310/68 B |
| 6,561,055 B1 | * | 5/2003 | Turk ........................... 74/425 |
| 2001/0013715 A1 | | 8/2001 | Schunke et al. |

FOREIGN PATENT DOCUMENTS

| | | |
|---|---|---|
| DE | 744010 | 1/1944 |
| DE | 1927741 | 12/1969 |
| DE | 3733922 | 4/1989 |
| DE | 9318082.9 | 4/1994 |
| DE | 19613814 | 10/1997 |
| DE | 19712153 | 10/1998 |
| DE | 299 20 996 | 11/1999 |
| DE | 19856716 | 4/2000 |
| DE | 19952736 | 10/2000 |
| EP | 0681359 | 11/1995 |

* cited by examiner

*Primary Examiner*—William C. Joyce
(74) *Attorney, Agent, or Firm*—Harness, Dickey & Pierce, P.L.C.

(57) ABSTRACT

An electric-motor drive system having a drive motor and a drive train comprising a worm gear, designed such that the overall dimensions are comparatively small and the pivot angle of rotation of the component cooperating with the output member of the drive system is comparatively large. The worm gear is the output member of the drive train. The worm gear has a central shaped hole for positive-fit connection to a rotatable input member of an adjustable device. The worm gear has a further gear step, preferably a worm drive, on the output side.

5 Claims, 3 Drawing Sheets

ELECTRIC-MOTOR-DRIVEN ACTUATOR

This is a continuation of copending application(s) International Application PCT/EP01/13249 filed on 16 Nov. 2001 and which designated the U.S.

BACKGROUND OF THE INVENTION

The invention relates to an electric-motor drive system, especially a furniture drive system, including a drive motor and a drive train containing a worm drive.

In currently known drive systems used preferably in furniture, the drive motor drives a worm engaged with a worm gear. The worm gear is connected to a spindle onto which is placed the spindle nut, locked to prevent rotation, which is linearly displaced by the rotation of the spindle. In standard drive systems, the front face of the spindle nut presses against a linking lever connected in a rotationally fixed manner to the adjustable component. Due to the length of the spindle, these proven drive systems require correspondingly large fitting dimensions which are available, for example, in reclining furniture but not in seating furniture. For this reason, a drive system is already known in which the worm gear has an internally threaded hole into which the rotationally-locked spindle is screwed so that it is linearly displaced by the rotation of the worm gear. A design is also known in which the linearly traveling spindle nut has gear teeth which engage the tooth segment. While the dimensions of these designs are reduced relative to the above drive systems, all drive systems have the disadvantage that the pivot angle of the lever connected to the fixed component is relatively small, normally less than 90°. A larger pivot angle is required, however, especially for seating furniture.

SUMMARY OF THE INVENTION

The goal of the invention is to design an electric-motor drive system of the type described in more detail above wherein the largest possible pivot or rotational angle is achieved for the component interacting with the output member of a drive system with the smallest possible dimensions. This goal is achieved by a solution in which the worm gear is the output member of the drive train.

Since here the drive system is designed so that the worm gear is the output member, a pivot angle of 360° in both rotational directions may be achieved since the worm gear is completely free to rotate. The worm gear may be connected directly to the pivoting component or, on the other hand, through appropriate linking elements. The preferred approach is to provide the worm gear with a shaped hole to create the positive-fit connection to an input-side component such as a pin of a device which is adjustable by the drive system. This provides a form-fit connection which prevents any displacement over time of the connected component relative to the worm gear. Preferred shapes of the shaped hole include that of a multiple spline or polygon. A square hole is preferred, however. This design has the advantage that the worm gear of the drive system may be slid onto an appropriately shaped pin of the adjustable device. The drive system is appropriately located in a two-part housing so that after assembly, the second housing component may be connected to the first housing component, for example by a screw-on connection. The housing components are designed to be permanently attached in the simplest manner to the object, for example, the frame 30 of an armchair.

The drive system in question should be not only compact, and thus of a space-saving design, but also inexpensive to produce. The approach used is therefore one in which the worm engaging the worm gear is designed as a threaded spindle, a trapezoidal threaded spindle being a preferred design. These spindles are available commercially, and are thus extremely inexpensive. Since the drive system is in continuous operation, this design of the worm and worm gear is completely adequate. In most usage situations, the rotational angle of the worm gear must be restricted. This angle is based on the adjustment range of the driven device. Provision is thus made to limit the rotational angle of the worm gear by appropriately positioned limit switches. These limit switches may also be adjustable, thus allowing the rotational angle to be adjusted for the specific use. An especially preferred design has the worm gear coupled to a radial cam, the latter being designed so that the limit switch or limit switches may be actuated in accordance with the function. The radial cam may be rotatable relative to the worm gear such that the rotational angle of the worm gear may be increased or decreased by rotating the radial cam. It is also possible, however, to provide the worm gear with pins for example, which strike fixed stops, thereby raising the level of the current supplied to the motor, as a result of which this rise is measurable, and the motor is switched off by an appropriate signal. The rotational speed of the worm gear should be extremely low. This property may be achieved by modifying the size or the number of teeth; however, since the drive system in question should have the smallest dimensions possible, a further modification interposes a gear unit which reduces the input rotational speed between the worm and the drive motor. This gear unit, or these gear units, significantly reduce the rotational speed of the worm relative to the output pin of the drive motor. It is especially advantageous if each interposed gear unit is an epicyclic gear unit, preferably a planetary gear unit. These gear units are not only of compact design, but their ratio of input speed to output speed of the drive motor is especially high. Each gear unit should be designed, however, so that the associated output pin is oriented in the direction of the output pin of the drive motor. It is especially advantageous if the output pin of each gear unit is aligned with the output pin of the drive motor since this configuration facilitates a compact design. In a preferred design, the drive motor is a DC motor operating on a safety isolating voltage of 24 volts or 42 volts.

In another embodiment, the axis of rotation of the worm or spindle engaged with the output worm gear is perpendicular to the output pin of the drive motor. This design also retains the advantages of a compact design, and the optimal rotational angle of the worm gear may be exploited as well. This design is reduced in length relative to the first-named design; however, it is somewhat wider. The specific design depends on the installation dimensions. In the last-named design, the gear unit between the drive motor and the output worm gear drive consists of an additional worm gear drive. The design provides that on one end section a worm gear is mounted in a rotationally fixed manner on the threaded spindle or worm engaged with the output worm gear, or that the worm gear along with the threaded spindle is designed as a single molded part, and that the worm gear engages another worm or another spindle, the longitudinal axis of which is parallel to and at a certain distance from the output pin of the drive motor. Depending on the number of worm drives, this drive could be called a double worm drive or a multiple worm drive. In preferred design, however, one worm is used to drive each interposed worm drive. This worm is mounted in a rotationally fixed manner either on an intermediate shaft, or one specific section of the intermediate shaft is designed as a worm. In terms of the drive function, this intermediate shaft is coupled to the output pin of the drive motor, preferably by a gear chain or belt drive. If slip-free operation of the drive system is required, either a gear chain or belt drive should be considered. In the preferred design, the threaded spindle or worm, as well as the worm gear located in the end section, are made of plastic.

The housing is preferably made of plastic by injection molding. By appropriately designing the mold, the corresponding process of screwing components together may be achieved in a single operation. The drive system may be controlled, for example, by a manual switch. The control unit and any necessary additional electrical or electronic components may be integrated in the housing. In a modified form, however, the control unit may be located outside the housing. In addition, the control unit may be mounted in an appropriate location within the object.

In another embodiment, the drive system is not dependent on the rotational angles of the limit switches and stops limiting the output worm gear - with the result that the output worm gear may be rotated without restriction, that is, it may complete more than one full revolution. It is especially advantageous if the housing of the electric drive system may be provided with two openings which are opposite one another as well as aligned with the shaped hole in the output worm gear so that one of the openings selectively faces a mechanism adjustable by the drive system. The installation position of the electric drive system is then selectable. A torque arm is appropriately provided on the housing of the drive system to maintain the position of the drive system during operation. This torque arm is appropriately a bracket containing a hole, the bracket being molded onto the housing and located opposite the output end, thereby creating the largest possible lever arm. Since the drive system can be operated in multiple installation positions, it is appropriate to have two spaced brackets, each containing a hole, molded onto the housing. This arrangement accordingly creates a fork head.

In another embodiment, a first worm gear is mounted in a rotationally fixed manner onto the output pin of the drive motor, the worm gear engaging a worm, and the output worm gear including the shaped hole is directly or indirectly drivable by an additional worm gear. In this design, the epicyclic gear after the drive motor is normally dispensed with. It is especially advantageous if the drive motor is fixed by a form-fit connection within three supports, this design eliminating the need for any additional attachment elements. In a preferred design, these supports may, however, consist of screws which engage corresponding recesses or pockets. It is also possible to provide the drive motor at its end face opposite the output pin with a central lug which engages one of the supports.

In another design, it is possible to attach the drive motor by screws to the housing of the drive system, preferably on the side facing the output pin, and to make the screws of a noise-attenuating material, for example, a plastic, or to make the screws of metal and have the screw heads which engage notched recesses surrounded, either completely or partially, by a nonmetallic material. Each attenuating ring might be made, for example, of plastic or rubber. If rubber is used, the attenuating rings could be standard O-rings. The use of plastic screws or the use of attenuating rings reduces overall noise created by operation of the drive system. If the drive motor is attached by supports within the housing, a design might be used in which, preferably, the supports associated with the drive side of the drive motor 11 are offset in such a manner that, with a form-fit attachment of the drive motor, compressive and/or tensile forces may act on the motor housing. The drive motor is accordingly braced such that the connection remains intact even in response to extremely long use. Attachment of the drive motor to the housing may also be accomplished by an end plate which is preferably mounted on the end face facing the output pin. This end plate appropriately has at least two attachment holes allowing for screw attachment to the housing. The attachment plate may be advantageously designed as a molded part which has pins in its edge regions, or the overall edge region is raised. In addition, it is possible for the rotational axis of the drive motor to be in an oblique orientation relative to the wall of the housing. This configuration, for example, allows a favorable pressure angle to be created for the drive component mounted on the output pin relative to another component.

A drive system more compact than the above-described designs is created when the worm gear engaging the worm mounted on the output pin of the drive motor drives a second worm which is aligned centrally with this worm gear and engages the worm gear including a shaped hole. This centrally oriented worm is then operated at the same rotational speed as the worm gear which engages the worm mounted on the output pin of the drive motor. The worm mounted on the output pin of the drive motor may also be of a one-piece design including the output pin, that is, the output pin of the drive motor is designed as a worm. In this design, the central worm is appropriately located in a centric hole in the worm gear, or it is inserted therein in a rotationally fixed manner, thereby permitting this worm and associated worm gear engaging the worm of the output pin to form a one-piece molded part. For example, it may be made of plastic by injection molding. The drive system is equipped with a control unit and a power supply, for example a transformer. The housing of the drive system is designed to accommodate the control unit and/or also the power supply within the housing. The rotational angle of worm gear including the shaped hole may be limited not only by limit switches or stops but also by an appropriate position-sensing system. The rotational angle may be set and modified as required. This position-sensing system may be created using Hall-effect sensors located in the motor. The control unit must be designed accordingly. Regardless of the design of the drive system, it may be easily installed since after the drive unit is mounted, for example on a shaft of the adjustable adjusting device, the drive system may, for example, be secured with only one screw. This screw then forms the torque arm. The electric motor system is self-locking. This feature is achieved by always locating an additional gear unit, for example, a worm gear system, in front of the output gearing stage. The drive systems described are designed to transmit a relatively high torque resulting from the high motor speed and the low speed of the output worm gear. The drive system described is thus especially suited for furniture, preferably armchairs, since the required torques or forces may be applied.

The drive system discussed is not only extremely compact, but a minimum number of components is required to achieve the function. In addition, the system may be simply and quickly installed. It is also especially advantageous that the drive system may also be retrofitted on items already in operation.

BRIEF DESCRIPTION OF THE DRAWINGS

The invention is explained in more detail based on the accompanying drawing.

DETAILED DESCRIPTION OF THE INVENTION

Figure 1A:
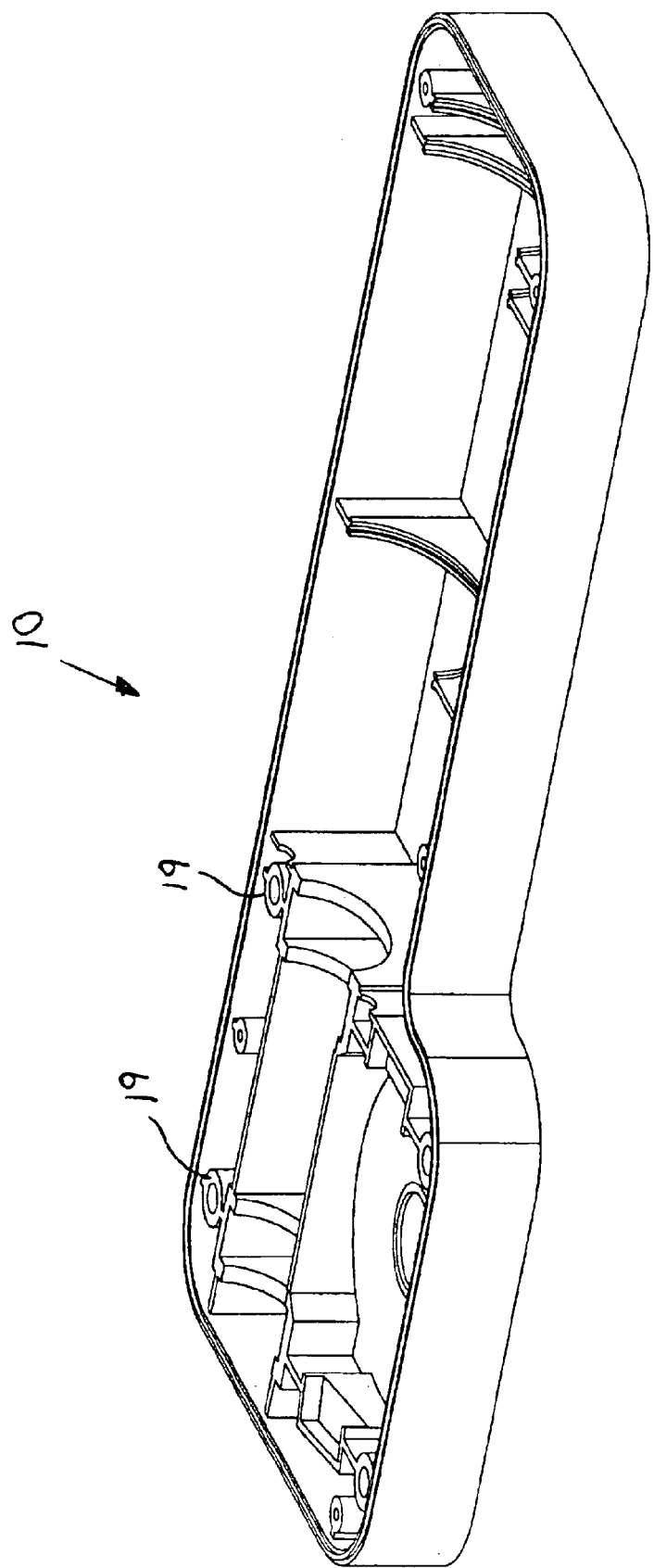
FIG. 1 is a view of a first embodiment of the electric-motor drive system according to the invention.

The electric-motor drive unit 10 shown in FIG. 1 is equipped with a housing consisting of two half housings or housing shells which are joined together, for example, by screws. A DC motor 11, not further described, drives an epicyclic gear unit 12, not further described. The output pin 12a of epicyclic gear unit 12 is aligned with the output pin of drive motor 1. In the embodiment shown, the diameters of drive motor 11 and of epicyclic gear unit 12 are approximately the same so that the housing has a tubular shape in the designated area. Output pin 12a of epicyclic gear unit 12 is connected in a rotationally fixed manner to worm 13. As shown in FIG. 1, a half housing or housing shell has been removed in order to show the functional components of the electric-motor drive system. Worm 13 may be a section of a trapezoidal. threaded spindle, not shown in detail. Worm 13 engages a worm gear 14, thereby significantly further reducing the rotational speed of worm gear 14 relative to the speed of output pin 12a of epicyclic gear unit 12. Worm gear 14 forms the output member of electric-motor drive system 10. To create the drive connection to the input member of an adjustment device not shown, worm gear 14 is provided with a shaped hole 14a which is centrally located and has a square cross-section in the embodiment shown. Other cross-sectional forms are conceivable, the essential aspect being that a form-fit connection is created with the input member of an adjustment device. The hole could thus also be a multiple spline. Worm 13 is supported in the end sections within roller bearings 15, 16. The bearings for worm gear 14 are not shown for representational reasons. Also not shown is that the control unit may be integrated within the housing of the electric-motor drive system. In a preferred design, the housing is made of plastic by injection molding; however, it is also possible to use a metal housing such as one composed of aluminum or a similar material. Two limit switches 17, 18 are installed within the housing which are functionally aligned with worm gear 14 so as to limit the rotational angle of worm gear 14. Eyelets 19 are molded into the inner side of the half housing and are threaded to allow the half housings to be screwed together.

Figure 2:
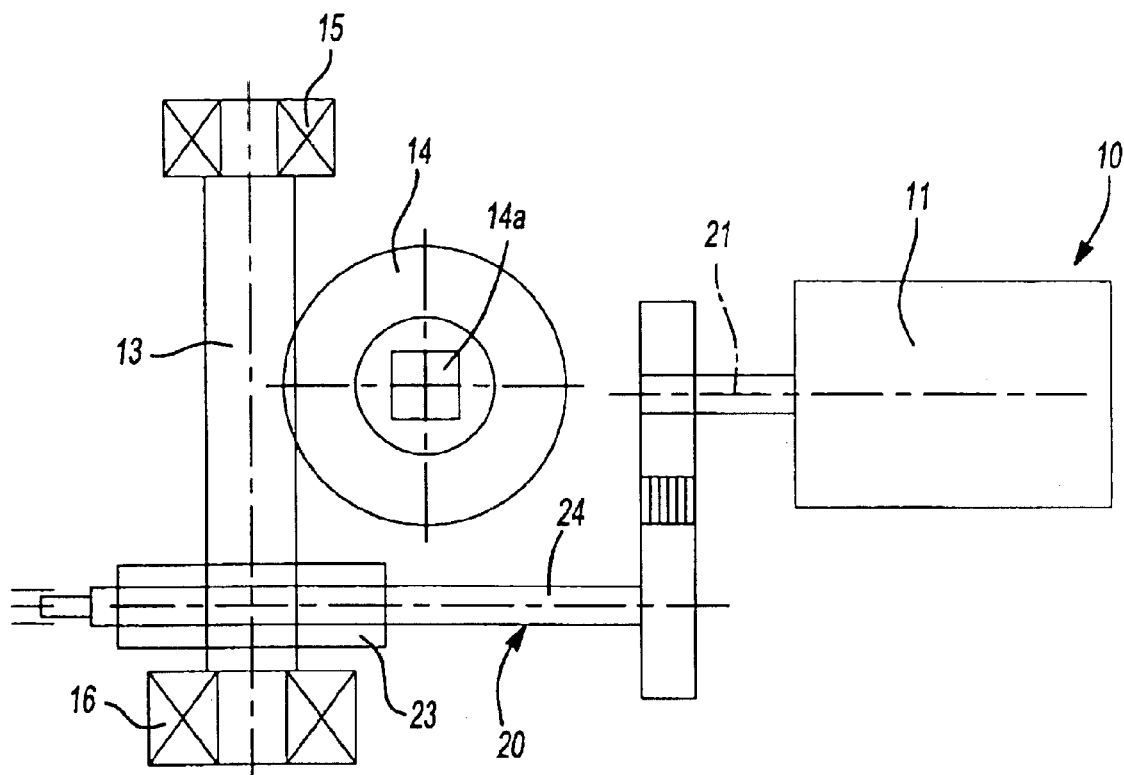
FIG. 2 is a view of a second embodiment of the electric-motor drive system according to the invention.
Figure 3:
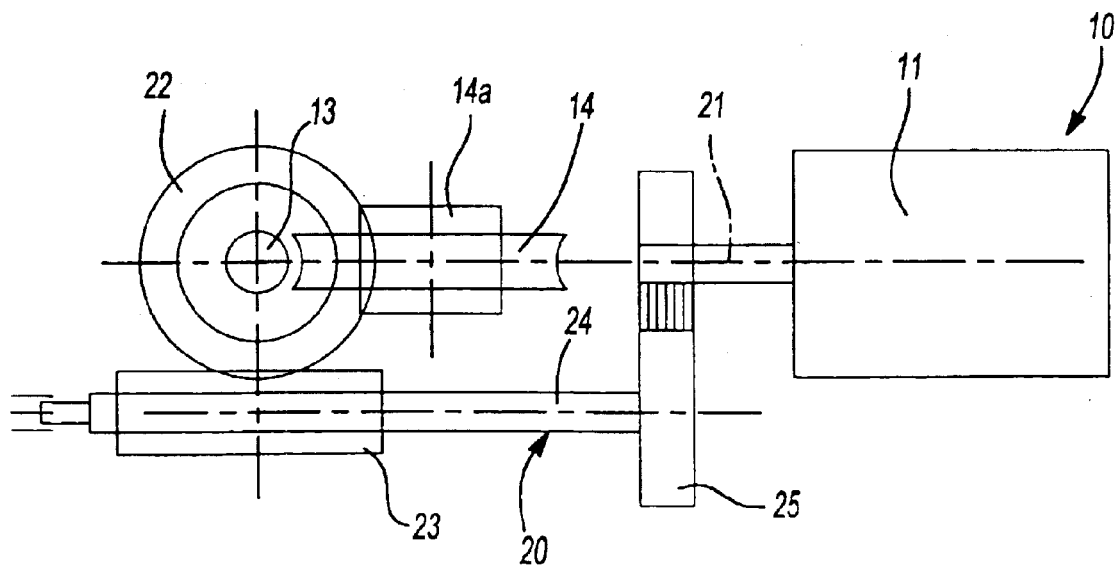
FIG. 3 is a view of the drive system of FIG. 2 rotated 90 degrees.

FIGS. 2 and 3 show a variant of the design in FIG. 1. The output worm gear 14 is again driven by a worm or a threaded spindle 13 through an intermediate drive 20 by motor 11. Motor 11 may also be a fan motor. In this design, the worm or threaded spindle 13 is, however, perpendicular to output pin 21 of DC motor 11. Output worm gear 14 is also provided with a shaped hole 14a in this design. Worm gear 14 engages the middle section of the worm or threaded spindle 13. Another worm gear 22, whose axis is rotated 90° to the rotational axis of worm gear 14, is located in an end section of threaded spindle 13 or of the worm. As FIG. 3 shows, worm gear 22 engages another worm 23. Worm 23 could, however, also be replaced by a threaded spindle. In the embodiment shown, worm 23 is mounted in a rotationally fixed manner on an intermediate shaft 24. This intermediate shaft 24 is parallel to and a certain distance from output pin 21 of DC motor 11. Worm 23 and intermediate shaft 24 may also be formed by a one-piece molded part. The drive connection between intermediate shaft 24 and the output pin of DC motor 11 is achieved preferably by a gear chain 25 or belt drive, especially by a toothed belt. In the embodiment shown, output pin 21 and intermediate shaft 24 overlap only by the width of gear chain 25, the overlap could, however, be increased to reduce the length of the electric-motor drive system. As FIGS. 2 and 3 show, output worm gear 14 is located between the threaded spindle 13 or worm which it engages and drive motor 11, thereby minimizing the length of electric-motor drive system 11.

In the design of FIGS. 2 and 3, the rotational speed of intermediate shaft 20 may be reduced or increased by gear chain 25 or by the belt drive. Unlike the configuration shown in FIGS. 2 and 3, gear chain 25 or the belt drive may be dispensed with, however. Output pin 21 of motor 11 is then aligned with intermediate shaft 20 and is connected in a rotationally fixed manner through a coupling element with the latter. The specific design of the electric-motor drive system depends on the intended use.

Control of DC motor 11 may be effected by a manual switch and a cable connection, but it is also possible to transmit the signals wirelessly. In addition, an appropriately designed voice-activated control may be used.

Figure 4:
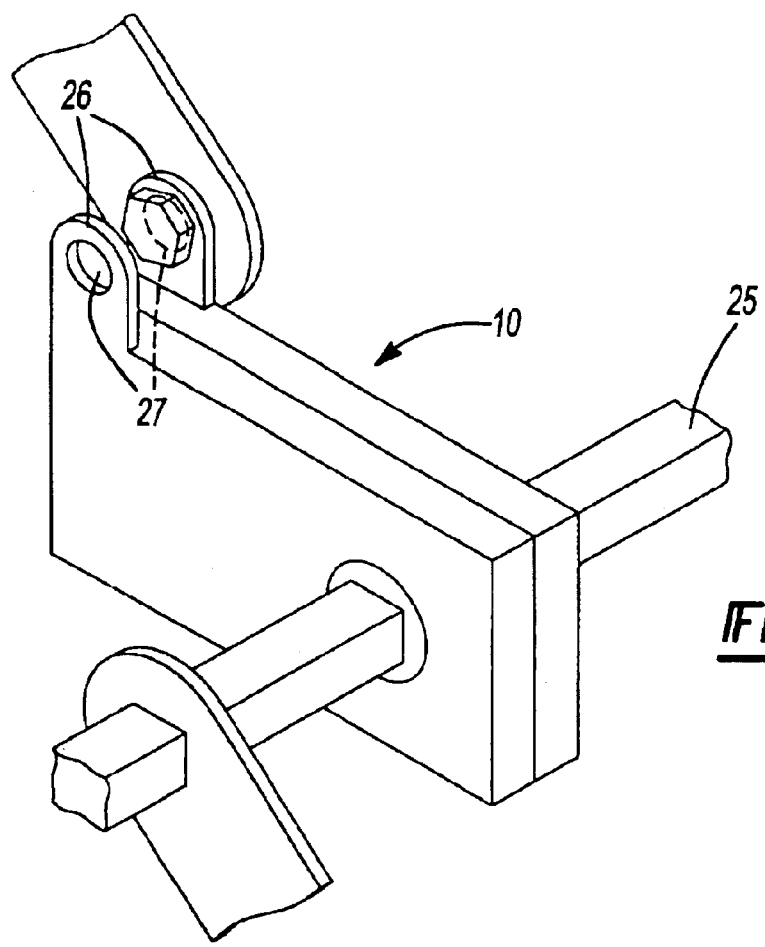
FIG. 4 is a perspective view of another embodiment of the drive system according to the invention.

FIG. 4 shows another embodiment in which specifically the housing of electric-motor drive system 10 is modified as compared to the design of FIGS. 1 through 3. The drive elements may be arranged in one of the previously described configurations. FIG. 4 is intended to demonstrate that the housing of the drive system is provided with openings on two facing sides which are aligned with shaped hole 14a of output worm gear 14. The connection to the input member of an adjustment system, not shown, may be achieved by a shaped rod 25 which is inserted in a closing manner into shaped hole 14a of the output worm gear. In the opposite end section, the housing of the drive system is equipped with a torque arm which consists of brackets 26 molded onto the housing and accordingly forming a fork head. Brackets 26 are each equipped with a hole 27. FIG. 4 shows that the adjustment system adjusted by the drive system may be selectively located on either side of drive system 10. In addition, the two aligned openings of the housing allow the drive system to be selectively installed in the drawn configuration, in a rotated configuration, or in a mirror-image configuration. The specific installation position depends on the existing installation spaces and on the design of the adjustment device.

Figure 5:
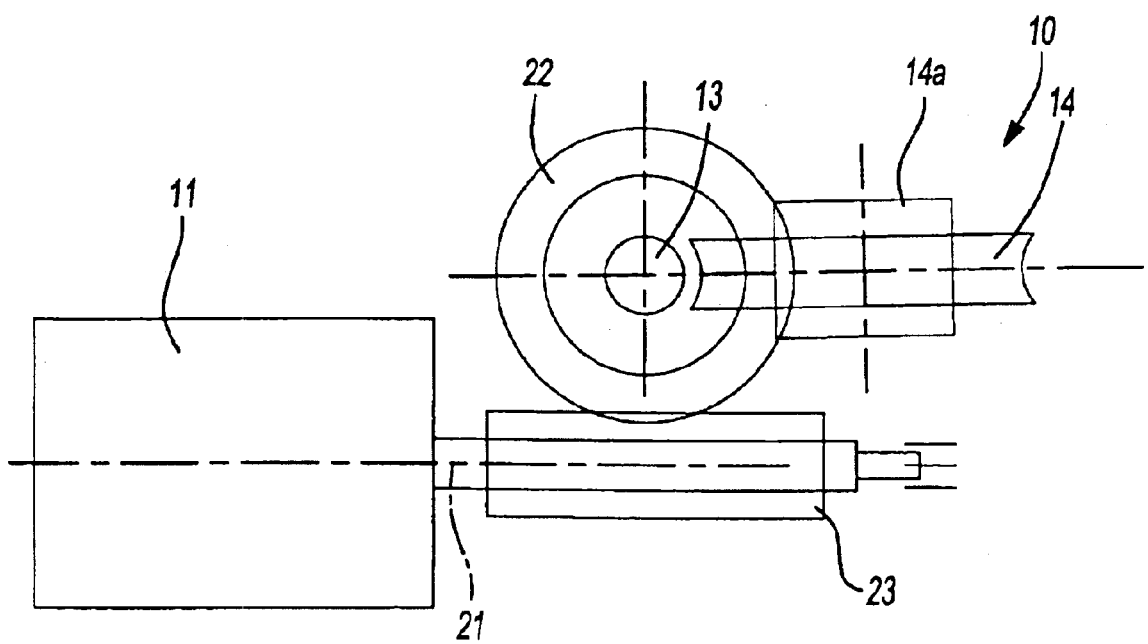
FIG. 5 is another embodiment of the drive system according to the invention.

FIG. 5 shows an extremely compact design. In this design as well, worm 23 is mounted in a rotationally fixed manner onto output pin 21 of drive motor 11. Unlike the design of the drawing, output pin 21 may also be designed as a worm. This worm 23 engages worm gear 22, whose rotational axis is offset and at right angles to the rotational axis of output pin 21. This worm gear drives another worm 13 which is positioned centrally relative to worm gear 22. This worm 13 may, for example, be inserted in a rotationally fixed manner into a centric bore in worm gear 22. It is also possible to design worm gear 22 and worm 13 as a one-piece molded part. Worm 13 engages worm gear 14 containing shaped hole 14a. The design of FIG. 5 could also be called a double worm drive. The rotational axis of the output worm gear 14 is offset relative to output pin 21 of drive motor 11 and is perpendicular thereto. FIG. 5 shows that this drive system is extremely compact in design.

The invention is not limited to the embodiments shown. The essential point is that to increase the rotational angle of the component adjustable by the drive system beyond 90°, worm gear 14 must form the output member of electric-motor drive system 10.

Those skilled in the art will appreciate that numerous modifications and variations may be made to the above disclosed embodiments without departing from the spirit and scope of the present invention.

What is claimed is:

1. An article of seating or reclining furniture comprising:
   a seating or reclining furniture frame;
   a moveable component;
   a furniture drive system adapted to drivingly interconnect said moveable component and said seating or reclining furniture frame, said furniture drive system comprising:
      a drive motor; and
      a drivetrain having a first worm fixed to an output shaft of said motor, a first worm gear drivingly engaged with said first worm, a second worm fixed to said first worm gear, and a second worm gear drivingly engaged with said second worm, said second worm gear being positioned on a side of said second worm gear opposite said motor, said second worm gear being rotatable about an axis that is not parallel to said output shaft; wherein said second worm gear includes an axis of rotation and is rotatable about its axis of rotation for more than one revolution; and wherein a housing includes a first part separable from a second part, said drive motor and said drivetrain being mounted within a cavity defined by said housing.

2. The article of furniture of claim 1 wherein said first part, said second part and said second worm gear each include an aperture extending therethrough, each of said apertures being coaxially aligned with one another.

3. The article of furniture of claim 1 further including a shaped rod drivingly engaged with said second worm gear, said shaped rod being drivingly coupled to said moveable component.

4. The article of furniture of claim 2 wherein said shaped rod extends through said apertures of said first part, said second part and second worm gear.

5. The article of furniture of claim 1 wherein said axis of said second worm gear is oriented substantially perpendicular to said output shaft.

* * * * *

UNITED STATES PATENT AND TRADEMARK OFFICE
CERTIFICATE OF CORRECTION

| | | |
|---|---|---|
| PATENT NO. | : 6,952,976 B2 | Page 1 of 1 |
| APPLICATION NO. | : 10/196851 | |
| DATED | : October 11, 2005 | |
| INVENTOR(S) | : Roither et al. | |

It is certified that error appears in the above-identified patent and that said Letters Patent is hereby corrected as shown below:

Title Page, Item (75), Inventors,
Third inventor should be added as follows:
-- Thomas Brown, Lancashire, England --.

Column 5, Line 19,
"drive motor 1" should be -- drive motor 11 --.

Column 5, Line 27;
"trapezoidal." should be -- trapezoidal --.

Signed and Sealed this

Third Day of October, 2006

JON W. DUDAS
*Director of the United States Patent and Trademark Office*